Feb. 1, 1944.  C. M. EASON  2,340,416
POWER CONTROL FOR PUNCH PRESSES AND THE LIKE
Filed Oct. 15, 1941    7 Sheets-Sheet 2

INVENTOR.
Clarence M. Eason
BY
Brown, Jackson, Boettcher & Dienner
Attys.

Feb. 1, 1944. C. M. EASON 2,340,416
POWER CONTROL FOR PUNCH PRESSES AND THE LIKE
Filed Oct. 15, 1941 7 Sheets-Sheet 3

INVENTOR.
Clarence M. Eason
BY
Brown, Jackson, Boettcher & Dienner
Attys.

Feb. 1, 1944.   C. M. EASON   2,340,416
POWER CONTROL FOR PUNCH PRESSES AND THE LIKE
Filed Oct. 15, 1941   7 Sheets-Sheet 4

INVENTOR.
Clarence M. Eason
BY
Brown, Jackson, Boettcher & Dienner
Attys.

Feb. 1, 1944. C. M. EASON 2,340,416
POWER CONTROL FOR PUNCH PRESSES AND THE LIKE
Filed Oct. 15, 1941 7 Sheets-Sheet 6

INVENTOR.
Clarence M. Eason

Feb. 1, 1944.   C. M. EASON   2,340,416
POWER CONTROL FOR PUNCH PRESSES AND THE LIKE
Filed Oct. 15, 1941   7 Sheets-Sheet 7

INVENTOR.
Clarence M. Eason

Patented Feb. 1, 1944

2,340,416

UNITED STATES PATENT OFFICE 2,340,416

POWER CONTROL FOR PUNCH PRESSES AND THE LIKE

Clarence M. Eason, Waukesha, Wis.

Application October 15, 1941, Serial No. 415,022

19 Claims. (Cl. 192—144)

The present invention relates to clutches designed primarily for driving punch presses and such other machines and devices as are characterized by a single stroke operation, a single revolution, or other single or limited operation. While the invention resides primarily in those features of the clutch control mechanism having to do with single stroke or single trip operation of a punch press, nevertheless the invention is not essentially limited thereto because the control mechanism also includes improved features having to do with continuous or repeated running of the press.

There has been a continuous trend in recent years toward higher and higher speeds in heavy duty punch presses. One reason for this is the obvious one of increasing the output of such presses. Another reason, not so obvious, is that the higher speeds produce a cleaner, sharper molecular separation of the metal, when a cutting or punching operation is to be performed. When punching out blanks and performing other operations where a clean-cut shear of the metal is desired, as distinguished from a drawing operation where there is no complete separation of the metal, the higher speeds produce a sharper, cleaner shear of the metal. Furthermore, the higher speeds, with their higher kinetic energies in the ram and in the movable die, use less power. Still another reason for higher speeds is the psychological effect on the workman. There is no delay in waiting for the machine to perform its operation. Instead, the reverse is true because the machine is then waiting for the man. Hence, the man is inspired to work faster in an effort to keep up with the machine.

This continuous trend toward higher speeds has resulted in increased adaptation of friction clutches to the operation of punch presses, it having been long recognized that a friction clutch possesses definite operating advantages over a jaw or pin clutch for this type of punch press use, particularly from the standpoint of reduced shock at time of engagement, reduced wear of clutch surfaces, almost complete elimination of clutch noise, etc. The successful use of friction clutches in heavy duty punch presses has been greatly aided by the development of improved servo types of friction clutches wherein torque transmitted through the clutch is utilized to obtain a very high engaging pressure of the friction surfaces. In my earlier Patent No. 2,268,578, issued January 6, 1942, and in my later Patent No. 2,308,679, issued January 19, 1943, I have illustrated friction clutches for punch presses wherein heavy engaging pressures are established between the clutch surfaces by a helical spline type of servo mechanism in the one instance, and by a toggle strut type of servo mechanism in the other instance. These servo mechanisms prevent slippage of the clutch by imposing an extremely high pressure upon the clutch surfaces, particularly at the instant of maximum torque, viz., at the instant of impact of the movable die with the work. In the construction disclosed in the present application, I preferably employ a toggle strut type of servo mechanism for obtaining certain advantages, although the construction may employ a helical spline type of servo mechanism, if desired. Furthermore, the invention can also be utilized with substantially the same advantages in ordinary spring load clutches having no servo action.

The aforementioned trend toward higher and higher press speeds, approaching 1,000 R. P. M., and possibly even higher speeds in the immediate future, has greatly complicated the control of these press clutches. For example, when operating an older type punch press under the relatively slower speeds of approximately 100 to 150 R. P. M. heretofore prevailing in heavy duty work, it was not difficult for the operator to depress the tripping pedal for causing a single stroke operation and to then quickly remove his foot from the pedal before another single stroke operation could start. However, when operating a press at considerably higher speeds, approaching 1,000 R. P. M., it is almost physically impossible for the operator to depress the tripping pedal through its full range of movement for causing a single stroke operation, and still get his foot off the pedal quick enough to prevent another cycle of operation. Accordingly, greater hazards are introduced into the operation of the clutch control mechanism by these higher speeds.

One of the objects of the present invention is to embody improved safety features in the control mechanism employed in clutches of the above description. The principal purpose of these safety features is to thoroughly safeguard the clutch against accidental repeating operation when set for single trip operation.

Another object of the invention is to provide an improved clutch and control mechanism which can be quickly and easily converted or changed over from single trip operation to repeating operation, and vice versa.

Another object of the invention is to provide an improved clutch and control mechanism which will be capable of quick and effective engagement and release at the relatively high speeds above mentioned.

Other objects, features and advantages of the invention will appear from the following detailed description of certain preferred embodiments thereof. In the accompanying drawings illustrating such embodiments:

Figures 1, 2:
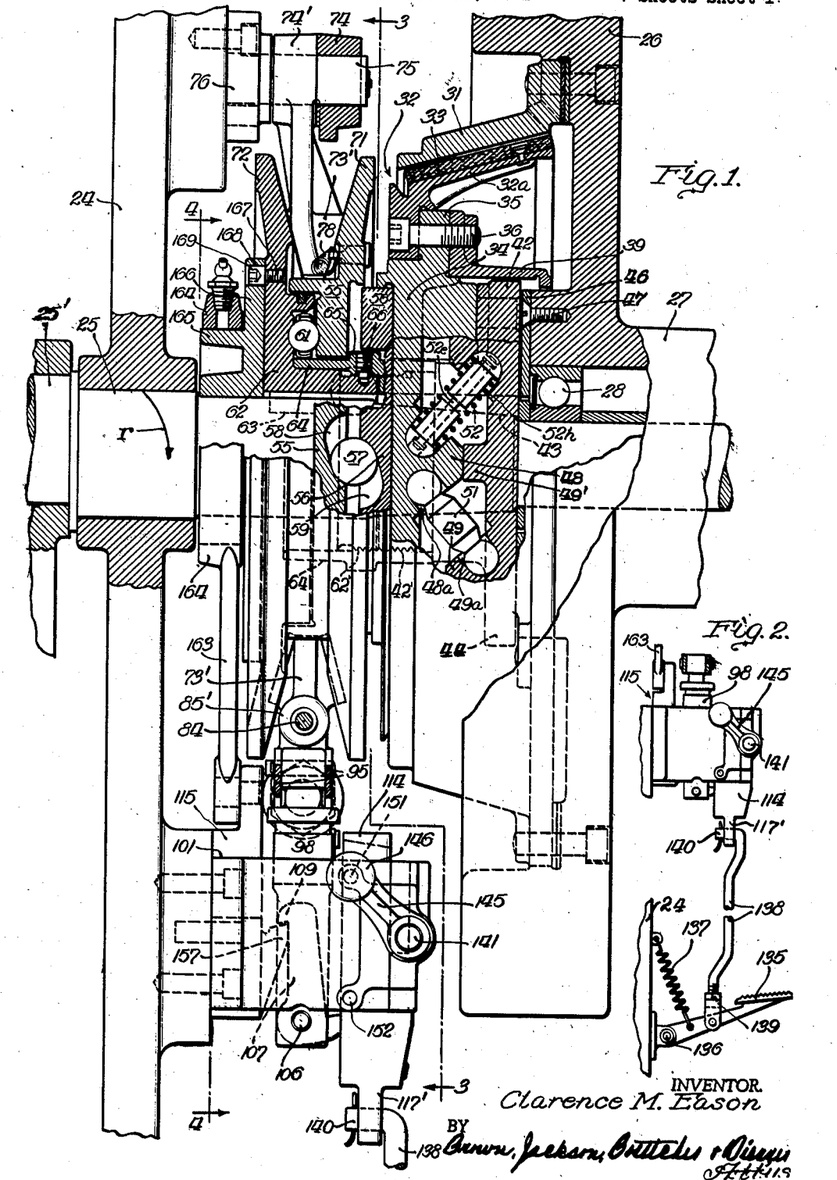
Figure 1 is a longitudinal sectional view through one form of the invention, certain of the operating parts being illustrated in a section plane or planes disposed forwardly of the axial plane for facility of disclosure.
Figure 2 is a fragmentary diagrammatic view illustrating the operating connection between the clutch control mechanism and the tripping pedal.

Referring first to Figure 1, the adjacent side portion and end bearing of the punch press is indicated fragmentarily at 24, the crank shaft is indicated at 25, the crank at 25', and the flywheel, beltwheel, bull gear, or other driving element is indicated at 26. The hub portion 27 of said belt wheel or flywheel is journaled on the reduced outer end of the crank shaft 25 through the medium of thrust resisting anti-friction bearings 28. The driving element of the clutch comprises a female cone member 31 which is secured to the belt wheel 26. The driven element of the clutch comprises a coacting male cone 32a, this being shiftable axially for effecting clutch engagement with the non-shiftable female cone 31. The shiftable male cone is one part of an assembly which makes up the shiftable clutch element, and which I have designated 32 in its entirety. Any suitable clutch lining material 33 is riveted to the male cone 32a.

The shiftable clutch element 32 comprises a central hub structure 34 having a radially extending flange 35 to which is secured the central portion of the driven cone 32a by the cap screws 36 passing through the web portion of said cone and through said flange. The shiftable assembly also includes a laterally projecting enclosing ring 39 which partially houses the servo struts and the spring struts to be hereinafter described, the ring having a radially extending flange which abuts the flange 35 and which is secured thereto by the cap screws 36. Embraced within the hub structure 34 and housing ring 39 is the thrust reaction member 42 which receives the thrust reaction of the toggle struts and establishes the torque transmitting connection between the shiftable clutch element and the crank shaft 25. Said member 42 is rigidly anchored to the shaft 25 by a drive key 43 and by a tight fit on a tapered portion of such shaft, although it will be understood that a splined connection may be employed in lieu thereof, if desired. The radially extending flange 44 at the outer end of the member 42 abuts against the thrust ring 46 which is secured to the hub 27 of the driving element 26 by the screws 47. Thus, the thrust reaction incident to the axial movement of the shiftable clutch element 32 into engagement with the non-shiftable clutch element 31 is transmitted back through the thrust plate 46 and through the hub 27 and web portion of the driving element 26 to the non-shiftable clutch element 31. The forces set up in the operation of releasing the clutch are transmitted through the thrust plate 46, hub 27 and thrust bearings 28 to the shaft 25.

In the preferred construction illustrated, the toggle strut type of servo mechanism is employed, such as is illustrated in my prior Patents No. 2,308,679 and No. 2,308,680, although it will be understood that the present invention is not limited to this particular clutch structure or to this form of servo mechanism. In fact, in one of the embodiments herein disclosed I have shown my invention embodied in a spring loaded clutch which does not employ any servo mechanism. The strut type of servo mechanism illustrated in the embodiment of Figure 1 is disclosed in complete detail in my prior Patent No. 2,308,679, and accordingly, I have only made a schemaitc illustration thereof in the present drawings. Briefly describing this strut apparatus, in connection with Figure 1, it will be seen that the shiftable member 32 is formed with a plurality of lugs or bosses 48 which project laterally toward the right, and that the thrust reaction member 42 is formed with a plurality of lugs or bosses 49 which project laterally toward the left, the lugs or bosses of one member alternating or extending into the spaces between the lugs or bosses of the other member around the peripheries of the members. Interposed between these alternating bosses are the driving toggle struts 51 and the spring toggle struts 52. The driving struts 51 are solid fixed-length steel units somewhat resembling dumbbells, the spherical end heads being relatively large and being accurately machined and ground for sustaining high compressive thrust loads through such end heads with minimum friction. These spherical end heads engage respectively within the spherical sockets 48a and 49a formed, respectively, within the bosses 48 and the bosses 49. These sockets are accurately machined and ground, and are preferably of a slightly larger radius than the ball ends of the struts. The reverse driving, spring toggle struts 52 each comprise the two separate shank portions having semi-spherical heads at their outer ends. The two strut sections are both slidable along an axial pin 52e, the ends of which carry suitable stop rings which have snap engagement within annular grooves formed in the axial pin. These stop rings play within outer counterbores in the two strut sections thereby limiting outward extensibility of the strut. A relatively heavy compression spring 52h encircles the struts and has its ends abutting the annular shoulders defined by the under sides of the semi-spherical end heads. The latter end heads have rockable bearing mounting within the spherical sockets 48b and 49b which are accurately machined and ground within the bosses 48 and 49, respectively.

There are preferably three pairs of such driving and spring struts 51 and 52 spaced equidistantly about the periphery of the shiftable clutch member 32 and thrust reaction member 42. Of course, any desired number of pairs may be employed, but three pairs afford a three-point application of the spring pressure and also of the servo pressure. In this regard my invention contemplates either a construction in which the shifting and rotating movement of the shiftable clutch member 32, incident to clutch engagement and release, occurs on a bearing surface afforded by the hub of the thrust reaction member 42, or other equivalent bearing surface, or, in the alternative, where this shifting and rotating movement occurs as a floating motion on the struts so that rocking, tilting, radial displacement or a veritable universal joint action is permitted for enabling most effective co-action between the driving and driven cones.

The helical angle of each strut is an angular relation of the strut with respect to the axial line of the clutch. The forward driving struts 51 are all inclined at the same common angle with respect to this axial line, and the reverse driving struts 52 are all reversely or oppositely inclined at the same common angle with respect to this axial line. In the embodiment illustrated, this angular inclination is of substantially the same degree for both sets of struts, although the two sets may be disposed at considerably different angles, if desired. The degree of engaging pressure ultimately established in the clutch by the servo action of the struts can be proportioned as desired by varying the angular inclination of the struts. For example, as the angle of inclination of the struts 51 is made to approach the plane of rotation the servo action diminishes, and as the angle of inclination is made to approach the axial plane the servo action increases.

With reference to the spring struts 52, the springs of these struts function as the loading springs which normally tend to force the shiftable clutch element 32 into engagement with the non-shiftable clutch element 31. It will be observed that by virtue of their inclined positions, these struts impart an axial component and a rotating component to the shiftable clutch element. The axial component is further supplemented by the toggle action of the driving struts 51. The normal direction of rotation of the clutch and crank shaft is indicated by the arrow r. It will be noted that the spring struts tend to produce relative rotation between the driven clutch element 32 and the thrust reaction member 42 in opposite directions, i. e., they tend to rotate the driven clutch element in the forward direction of rotation r and, at the same time, tend to rotate the thrust reaction member 42 and the connected crank shaft 25 in the reverse direction of rotation. It is the compression springs on these spring struts 52 that are placed in the loaded or cocked condition by the inertia of the crank shaft and its connected parts when the clutch is disengaged, and which normally stand ready to effect engagement of the clutch instantly upon the tripping operation. As fully discussed in my prior Patent No. 2,308,679, the spring struts can also function as reverse drive struts. It is frequently desirable to be able to back up the press ram during the operation of changing or setting the dies, or freeing the movable die from a jammed condition in the work, and such can be readily accomplished in my improved construction by the action of the spring struts 52 contracting to a solid condition when the relative rotation between the clutch member 32 and the thrust reaction member 42 is in the direction tending to compress each strut 52.

Figures 4, 5, 6, 7:
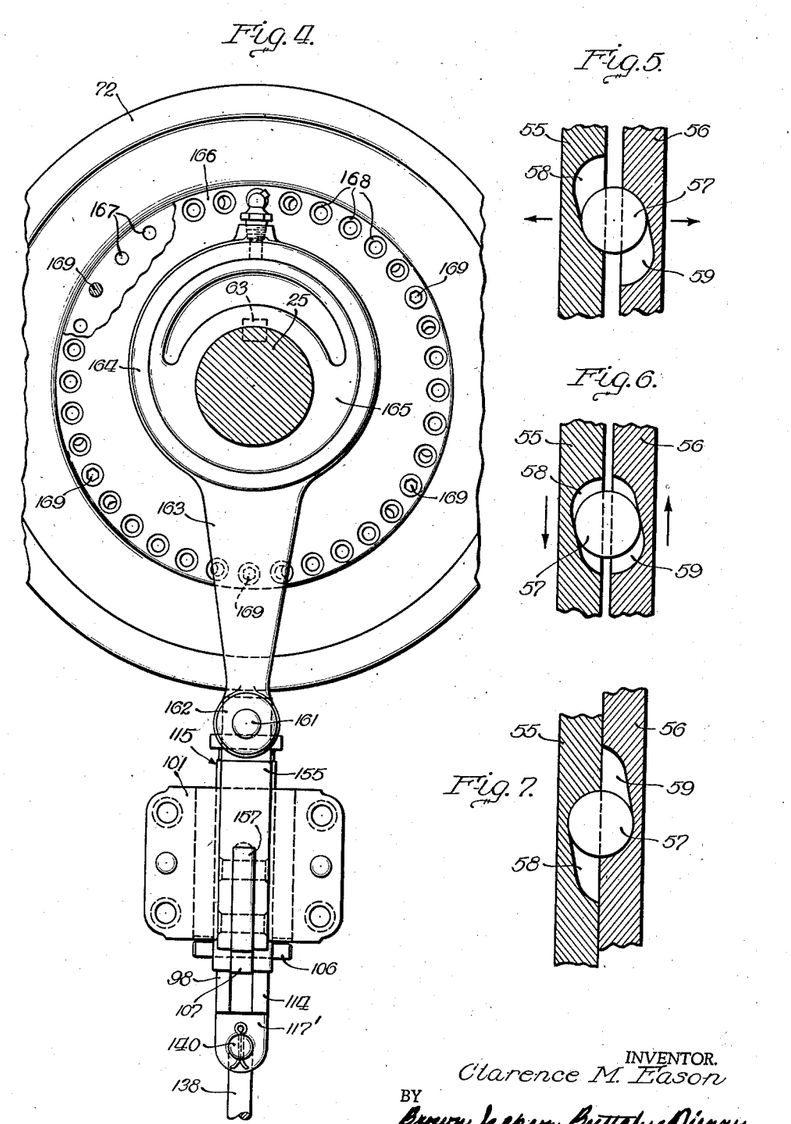
Figure 4 is a transverse sectional view in the opposite direction, taken approximately on the plane of the line 4—4 of Figure 1.
Figures 5, 6, and 7 are sectional diagrams showing different positions of the ball-cam clutch actuating member.

A portion of the clutch control mechanism is mounted on the crank shaft 25 at a point between the frame 24 of the press and the above described clutch structure. This control mechanism comprises the two circular cam plates or clutch actuators 55 and 56 between which are disposed balls 57. As shown in Figures 5, 6 and 7, the opposing faces of the two cam plates are formed with coacting runways 58 and 59 for each of the balls 57. The two cam plates or clutch actuators 55, 56 are capable of relative rotation, and such relative rotation operates through the balls and sloping runways 58, 59 to create a spreading or separating pressure between the cam rings, in the manner of a servo releasing mechanism, for shifting the shiftable clutch element to its disengaging position and for holding the shiftable clutch element in its disengaging position. The cam ring 55 is capable of rotary movement but is fixed against axial shifting movement, whereas the cam ring 56 is capable of both rotary and shifting movements. The non-shiftable thrust ring 55 is adapted to transmit its inwardly acting thrust through an anti-friction bearing 61 (Figure 1) to a hub structure 62 which is fixedly secured to the crank shaft 25 by the key 63 or other suitable driving connection. The hub member 62 is coupled to the thrust reaction member 42 by a coupling sleeve 64 which screws over a thread 62' on the hub member 62 and over a thread 42' on the reaction member 42. An outwardly extending flange 65 on the coupling sleeve 64 prevents outward shifting movement of the non-shiftable cam ring 55. A set screw 66 passing inwardly through this flange 65 engages in a bore in the hub member 62 for locking the coupling sleeve 64 in assembled relation.

Formed integral with the cam plate 55 is a brake drum 71, and formed integral with the hub structure 62 is a brake drum 72. These two brake drums 71 and 72 are of sloping or V-shaped section for receiving two brake shoes 73, 73' (Figure 3) of V-shaped section therebetween. These brake shoes are preferably identical and are formed at their upper ends with pivot hubs 74, 74' which have pivotal mounting on a supporting pin 75 projecting outwardly from a bracket plate 76 secured to the end of the press frame 24. It will be evident that the operation of contracting the lower ends of the two brake shoes towards each other will exert simultaneous braking retardation on both brake drums 71 and 72. The retarding of the drum 71 serves to retard the cam plate 55, which causes the balls 57 to run into the shallow ends of the pockets 58, 59, with consequent spreading between the two cam plates 55, 56 and shifting of the shiftable clutch element 32 to clutch releasing position. The retarding of the other drum 72 serves to retard the rotation of the crank shaft, crank, and ram, bringing these parts quickly to rest, and holding them in their normal positions with the crank 25' substantially in its upper dead center position. Hence, the simultaneous braking retardation exerted on the two brake drums releases the clutch and simultaneously brakes the crank shaft, crank and ram to bring them to rest in the proper normal position. The release of the two brake shoes 73, 73' by outward spreading movement thereof functions to release the two brake drums 71, 72 which simultaneously engages the clutch and takes the braking grip off the crank shaft, crank and ram. When the clutch control brake drum 71 is released the cam plate 55 immediately tends to run ahead under the camming action of the balls 57 in the cam pockets 58, 59, and also under the action of the rotary component exerted by the spring struts 52. That is to say, the straight axial thrust exerted by the spring struts 52 reacts through the cam pockets 58, 59 on the balls 57, tending to cause the balls to run to the deep ends of the cam pockets so that the cam ring 56 can shift axially to clutch engaging position. The rotary component exerted by the inclined spring struts 52 on the shiftable clutch element also tends to run the cam plate 55 on ahead as soon as the brake is released. Still further, a long coiled tension spring 78 (Figures 1 and 3) is stretched along the bottom of the groove between the two brake drums 71 and 72. One end of this tension spring 78 is secured to a pin 79 (Figure 3) anchored to the clutch controlling brake drum 71, and the other end of said spring is secured to a pin 81 anchored to the crank holding brake drum 72. The pull of this spring tends to cause the clutch controlling drum 71 to run on ahead as soon as the brake shoes 73, 73' are released, this spring thus assisting in the operation of engaging the clutch.

Figure 3:
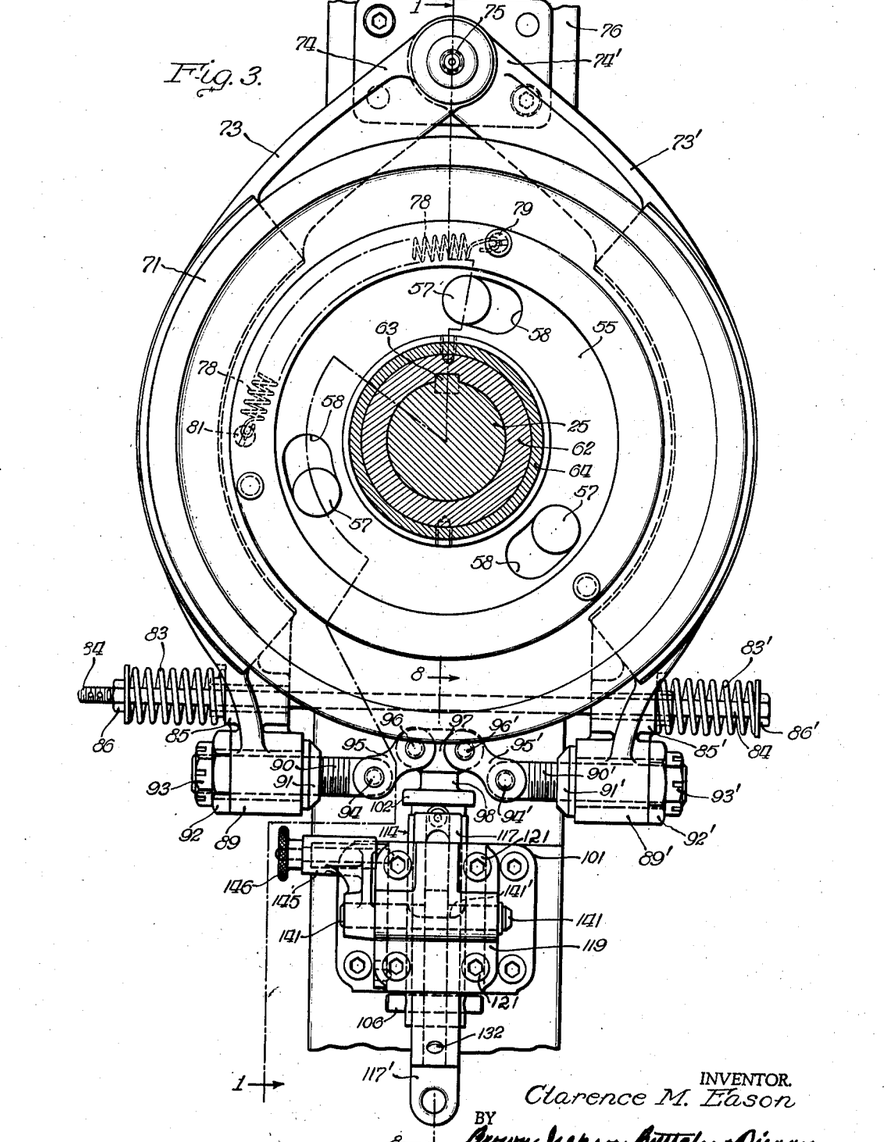
Figure 3 is a transverse sectional view taken approximately on the plane of the line 3—3 of Figure 1.

The lower ends of the two brake shoes are normally forced towards each other by a pair of compression springs 83, 83' (Figure 3). These two springs are mounted on the opposite ends of a through rod 84 which has freely slidable mounting in bosses 85, 85' formed adjacent the lower ends of the brake shoes. An adjusting nut 86 and cooperating washer compress the spring 83, and an end head 86' and cooperating washer compress the spring 83'. Adjustment of the nut 86 simultaneously adjusts both springs, and the through rod 84 assures equalized pressure on both brake shoes. Referring now to the brake operating mechanism, the lower ends of the brake shoes 73, 73' are formed with bosses 89, 89' in which toggle studs 90, 90' are mounted for endwise adjustment. The toggle studs screw through threaded sleeves 91, 91' which are rotatable in the bosses 89, 89'. Nuts 92, 92' lock the sleeves in the bosses, and nuts 93, 93' lock the toggle studs in the sleeves, after the toggle studs have been given the desired adjustment. The inner end of each toggle stud carries a transverse pivot pin 94, 94' on which are mounted the outer ends of pairs of toggle links 95, 95'. These toggle links are preferably of standard roller chain construction, although specially designed links can be employed if desired. The inner ends of said toggle links are pivotally mounted on two laterally spaced knuckle pivots 96, 96'. These knuckle pins are secured in the upper crosshead portion 97 of a vertically reciprocating brake operator 98. This brake operator 98 comprises a cylindrical stem portion which is guided within a cylindrical bore 99 (Figure 8) formed within a control housing 101 which is bolted to the side of the press frame 24. A stop collar 102 is formed on the brake operator 98, below the crosshead 97, and this stop collar is adapted to strike the top of the housing 101 for limiting the downward movement of the brake operator and toggle linkage. The brake-on position of the toggle mechanism and brake operator 98 is shown in Figure 3 (and in dotted lines in Figure 9), in which position of the parts the toggle links 95, 95' are at liberty to swing upwardly to whatever angle is necessary for enabling the springs 83, 83' to force the brake shoes into firm braking engagement with the drums 71 and 72. In the operation of releasing the brake mechanism, the brake operator 98 is pulled downwardly to carry the knuckle pivots 96, 96' into or slightly past a dead center position, this dead center line being indicated at x—x in Figure 9. This brake released position is illustrated in full lines in Figure 9, from which it will be seen that the knuckle pivots 96, 96' are only carried a very short distance past the dead center line x—x, the motion in this direction being limited by the stop collar 102 striking the top of the housing 101. The resulting spreading action occurring between the lower ends of the brake shoes releases the braking pressure of the shoes on the drums 71 and 72.

Figures 8, 9:
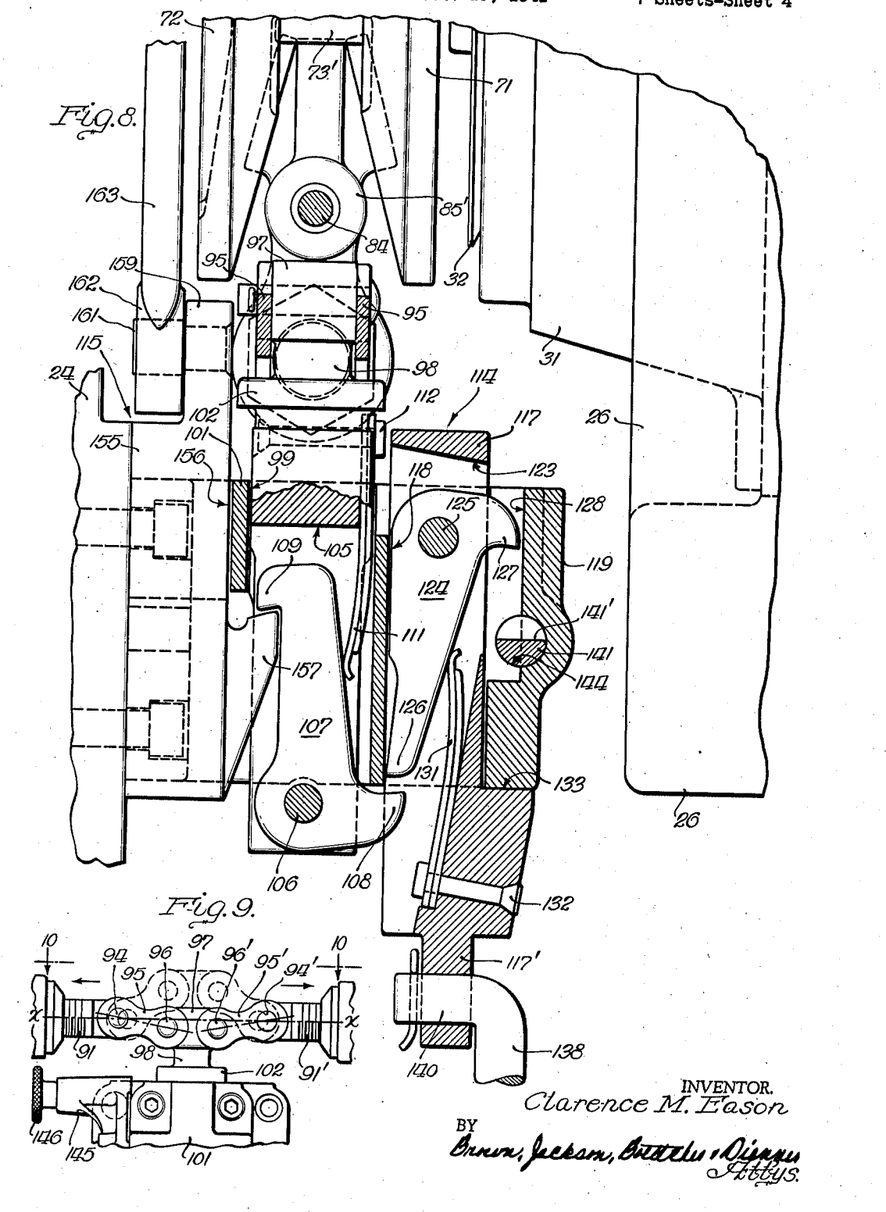
Figure 8 is an enlarged vertical sectional view through the clutch control mechanism.
Figure 9 is a fragmentary front elevation of the spring toggle mechanism which controls the brake apparatus.

Referring to Figure 8, a long slot 105 is milled transversely through the lower portion of the brake operator 98, and extending across the lower end of this slot is a pivot pin 106 on which is mounted a latch or dog 107 adapted to rock back and forth within the slot 105. The lower end of this latch member has a nose or shoulder 108 facing upwardly, and the upper end of said latch member has a nose or shoulder 109 facing downwardly. Suitable spring means is carried by the brake operator 98 for urging the latch member 107 toward the left, into the normal position illustrated in Figure 8, this spring means being shown as comprising a plurality of spring leaves 111 extending downwardly in a recessed forward portion of brake operator stem 98, the upper ends of these spring leaves being anchored to the stem by a transverse rivet or bolt 112.

Figures 10, 11, 12, 13, 14:
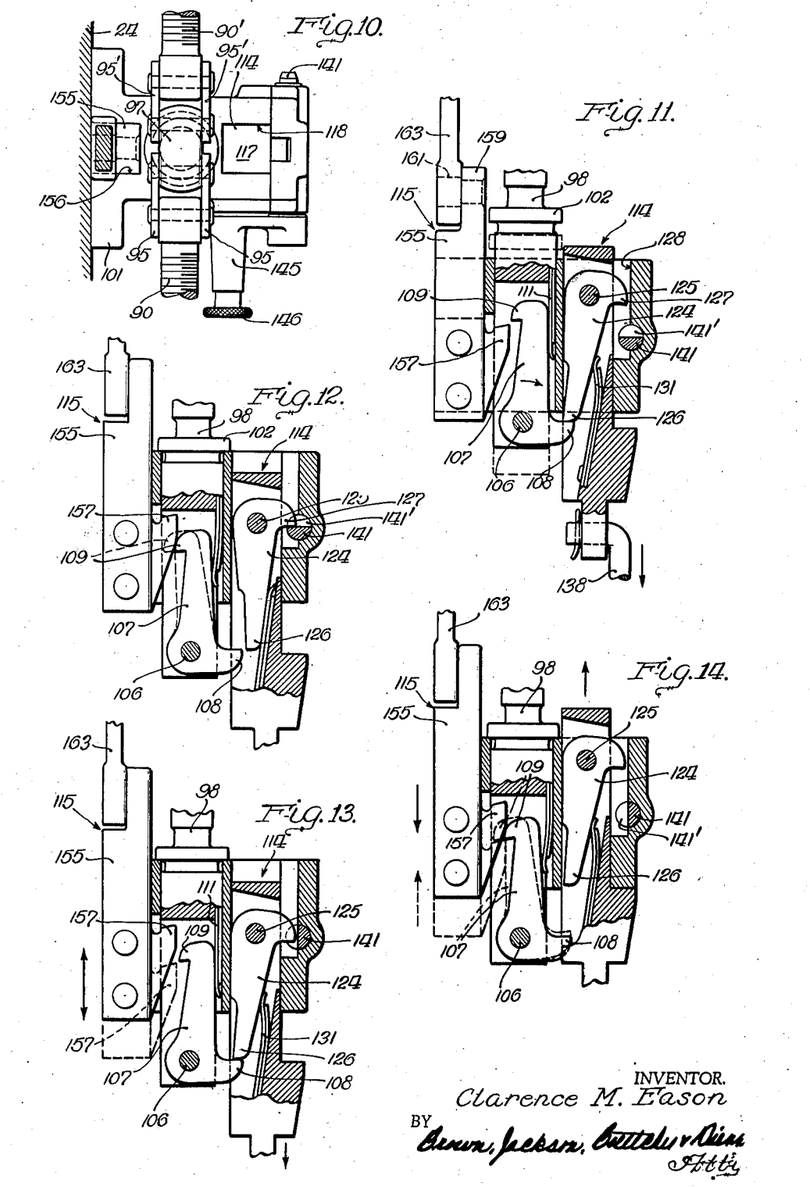
Figure 10 is a horizontal plan view of this toggle mechanism, corresponding to a view taken on the plane of the line 10—10 of Figure 9.
Figures 11, 12, 13 and 14 are detail sectional views showing different steps in the single trip operating cycle and in the repeating operating cycle of the clutch control mechanism.

The brake operator 98 is adapted to be actuated alternatively or selectively by a manual actuator 114 or by a power actuator 115 (Figure 8). When the clutch control mechanism is set for single trip operation, the brake operator 98 is adapted to be actuated alternately, first by the manual actuator 114 to engage the clutch, and then by the power actuator 115 to release the clutch. On the other hand, when the clutch control mechanism is set for repeating operation, the brake operator 98 is actuated by the manual actuator 114 and remains in its actuated position as long as the manual actuator remains in its actuated position. The manual actuator 114 comprises a slide block 117, preferably of rectangular cross-section, which is guided for vertical reciprocatory motion in a rectangular guideway 118 formed in the front face of the housing 101, as best shown in Figure 10. A removable cover plate 119 is secured by screws 121 (Figure 3) to the open front of the housing 101, this cover plate closing the open front of the guideway 118. Referring again to Figure 8, cored out in the slide block 117 is a long vertical slot 123, in which a treadle latch or dog 124 is pivoted on a pin 125 extending transversely through the slot 123. The lower end of the dog 124 is formed with a nose or shoulder 126 which is adapted to engage the lower shoulder 108 on the brake operator latch 107, this lower shoulder 108 on said latch extending into the vertical slot 123 of the guide block in position to be engaged by the nose 126. The upper portion of the dog 124 is formed with a laterally extending, downwardly facing shoulder 127 which is adapted to slide within a rectangular guide channel 128 formed in the inner face of the cover plate 119. Suitable spring means is carried by the manual actuator 114 for urging the dog 124 into the normal position illustrated in Figure 8, this spring means preferably comprising a pair of leaf springs 131 having their upper ends bearing against the side of the dog and having their lower ends anchored to the slide block 117 by the rivet or screw 132. An outwardly projecting shoulder 133 on the lower portion of the slide block is adapted to abut the lower edge of the front cover plate 119 for limiting the upward movement of the slide block.

The manual actuator 114 is adapted to be moved downwardly through an operating stroke by the act of depressing a suitable treadle 135, as diagrammatically illustrated in Figure 2. This treadle is pivoted at 136 to the press frame 24, or to any other suitable support, and may be arranged to face forwardly instead of laterally as shown in Figure 2. A suitable spring 137 normally tends to hold the treadle 135 in its raised position. A treadle link 138 has its lower end adjustably connected with the treadle through an adjustable clevis 139, and has its upper end pivotally connected at 140 to an apertured ear 117' extending downwardly from the slide block 117.

The change-over from single trip operation to repeating operation, or vice versa, is effected by rotating a slotted tripping shaft 141 to either one of two positions. As shown in Figure 8, this tripping shaft is mounted for rotation in a suitable bore 144 which extends transversely of the housing cover plate 119 in position to intersect the vertical guideway 128. A transverse kerf or slot 141' in the shaft 141 is adapted to align with the front wall of the guideway 128 when the shaft is rotated to the "clear" position illustrated in Figures 13 and 14. In this position of the shaft, the shoulder 127 of the dog 124 can continue down to a lower point in the guideway 128 (Figure 13) without being intercepted by the tripping shaft 141. When the shaft is rotated through 90° to the intercepting position illustrated in Figures 8, 11 and 12, the kerf 141' forms an intercepting stop against which the shoulder 127 strikes when the slide block 117 has been moved down approximately to the position illustrated in Figure 12. The intercepting of the shoulder 127 swings the nose 126 of dog 124 out of engagement with shoulder 108 of latch 107 (Figure 12), for effecting a single trip operation of the clutch, as hereinafter described more in detail. The intercepting shaft 141 is adapted to be rotated between its two positions through the medium of a crank handle 145 secured to the outer end of the shaft (Figures 1 and 10). A spring impelled locking bolt 146 is mounted in the swinging end of the crank lever 145 for effecting locking engagement selectively in either one of the two locking apertures 151 and 152 (Figure 1) formed in the side wall of the housing 101. When the lever 145 is swung to the upper position illustrated in Figure 1, with the locking bolt 146 engaging in the locking hole 151, the intercepter shaft 141 occupies the intercepting position shown in Figures 8, 11 and 12; and when the lever 145 is swung downwardly to bring the locking bolt 146 into registration with the lower locking hole 152 the intercepter shaft 141 is swung to the clear position illustrated in Figures 13 and 14.

Referring now to the power actuator 115, this device also comprises a slide block 155 of rectangular cross section arranged for reciprocatory motion in a rectangular guideway 156 recessed out of the back side of the housing 101 (Figure 10). A hook 157 projects outwardly from the front side of the slide block 155, this hook extending into the slot 105 of the brake operator 98, in position for engaging the upper shoulder or nose 109 of the latch 107 (Figure 8). For facility and cheapness of repair, the hook 157 may consist of a small steel insert which is riveted or pinned in a slot in the slide block 155, whereby in the event of substantial wear of the hook 157 it is only necessary to replace this small insert.

An offset lug 159 at the upper end of the slide block 155 carries a pivot pin 161 over which engages a pivot boss 162 at the lower end of a pitman 163. Referring to Figure 4, the upper end of the pitman 163 is formed with an eccentric strap or follower 164 encircling an eccentric 165. This eccentric is mounted on the crank shaft 25 and is adapted to be driven thereby. Novel provision is made for obtaining relatively small degrees of angular adjustment of the eccentric 165 relatively to the crank shaft 25. This adjusting means comprises an adjusting flange 166 (Figure 1) extending outwardly from the eccentric 165 and adapted to abut against the inner face of the brake hub member 62. A series of 30 equally spaced tapped holes 167 (Figure 4) are provided in the hub member 62, and the adjusting flange 166 is formed with 36 counterbored holes 168 which are equally spaced and arranged on the same radius from the crank shaft as the holes 167. The adjustable keying is effected by 6 socket head cap screws 169 which extend through six equally spaced holes 168 and thread into six aligned bores 167. The removal of these cap screws and their insertion into the next succeeding holes permits relatively fine angular adjustments of the eccentric 165 relatively to the crank 25', these adjustments being in the neighborhood of 2°. This wide range of adjustment of the eccentric 165 relatively to the crank 25' enables the clutch control mechanism to be readily changed for accommodating a wide variety of press speeds, and for accommodating a wide variety of work conditions. In the event that the press is to be run at a relatively slow speed, as for example in performing drawing operations as distinguished from punching operations, the eccentric will be given a very delayed or retarded setting relatively to the crank 25' so that the automatic action of utilizing the crank shaft torque to apply the brake mechanism through the medium of the eccentric 165 will not occur until the crank 25' is moving upwardly, the application of the brake being timed to bring the crank shaft to rest substantially with the crank in its upper dead center position. Conversely, if the press is to be operated at a very high speed for producing sharp clean punchings on thin metal stock, then the eccentric will be adjusted to a relatively advanced or leading position, so that the eccentric will begin to apply the brake many degrees in advance of the crank 25' reaching its upper dead center position, this large lead in the timing of the eccentric being necessary in order to compensate for inertia of parts and to bring the high speed rotation of the crank shaft to rest in ample time to have the crank stop substantially at the upper dead center position. This timing relation will be further described after the description of the cyclical steps of the control mechanism, illustrated in Figures 11, 12, 13, and 14.

Referring now to the cyclical steps of the control mechanism, Figure 8 illustrates the normal position of the control parts, with the brake engaged or on, and with the clutch disengaged or off. It will be noted that the brake-on position also imposes braking force on the crank shaft 25 through the other brake drum 72. In this normal position of the parts, the reciprocating brake operator 98 is in its upper position with the toggle mechanism 94—96 above the dead center line x—x, and with the latch 107 in the latching position shown in Figure 8. In this normal position of the parts, the manual actuator 114 is in its raised position, for disposing the nose 126 of the dog 124 above the shoulder 108 of the latch 107; and, in such normal position, the automatic or power actuator 115 is substantially in its uppermost position with the hook 157 disposed below the shoulder 109 of the latch 107. We shall assume that the punch press attendant has set the machine for single trip operation by placing the control handle 145 in its uppermost position, for disposing the tripping shaft 141 in transverse position, ready to intercept or block downward motion of the shoulder 127 on dog 124. To start the press the attendant depresses the pedal 135, which starts moving the manual actuator 114 downwardly, as shown in Figure 11. The nose 126 on the dog 124 engages the shoulder 108 and imparts clockwise rocking motion to the latch 107. This swings the upper hook portion 109 of the latch clear of the power actuated hook 157, and thereafter continued downward pressure exerted on the lower shoulder 108 starts moving the brake operator 98 downwardly. Such downward motion of the brake operator starts spreading the toggle mechanism 94—96 and thereby starts releasing the brake mechanism. The release of the brake mechanism permits the brake drum 71 to rotate forwardly for causing engagement of the clutch. In this downward motion of the brake operator 98, when the operator reaches the position indicated approximately in dotted lines in Figure 11, the toggle mechanism 94—96 has just moved into dead center alignment along the line x—x (Figure 9). Further motion of the brake operator is a spring actuated snap motion, which is capable of causing the brake operator 98 to run ahead of the manual actuator 114 if said actuator is being depressed slowly.

The final downward movement of the brake operator 98 and of the manual actuator 114 (for single trip operation) is illustrated in Figure 12. The brake operator has snapped downwardly through the final step of its movement to bring the shoulder 102 against the top of the housing 101. The shoulder 127 on the dog 124 has also been intercepted by the tripping shaft 141 for rocking the dog to its releasing position, with the nose 126 clear of the lower shoulder 108 on the latch 107. Thus, the latch 107 is free to swing to the left (as indicated in dotted lines) and transfer its operative connection to the power actuator 115. The power actuator assumes control of the brake operator 98 as soon as the rotation of the crank shaft has carried the hook 157 downwardly to the point where the pawl nose 199 can snap to the left over this hook. Upon upward movement of the power actuator 115 the hook 157 starts transmitting a power drive upwardly to the brake operator 98 through the latch 107. Assuming that the attendant has released the treadle 135 immediately upon depressing it, the manual actuator 114 will start its upward movement ahead of the brake operator 98, or substantially concurrently therewith, unless an extremely high driving speed is being transmitted to the press. In such event, and particularly if the attendant is somewhat tardy in releasing the treadle 135, the brake operator 98 may start back up under the power drive of the automatic actuator 115 while the manual actuator 114 is still substantially in its lowermost position, illustrated in Figure 12. This upward motion of the brake operator, ahead of the manual actuator 114, can readily take place by virtue of the lower hook 108 moving upwardly along the left hand edge of the dog 124, past the nose 126, as will be evident from Figure 12. This same advance operation of the brake operator, preceding the restoring movement of the manual actuator 114, will also take place if the attendant continues to hold the treadle depressed, even though the control mechanism is only set for single stroke operation. At this time, the shoulder 108 of the latch 107 will continue upwardly along the left hand side of the dog 124, as above described. Hence, the control mechanism is effectively safeguarded against accidental repeating operation under either one of the above conditions. Still further, the control mechanism is safeguarded against dangerous interfering operation in the event that the attendant is allowing the manual actuator 114 to move upwardly to its normal restored position with a relatively slow motion, or in the event that an extremely high speed being transmitted to the press causes the brake operator 98 to catch up with the manual actuator before the latter can get back to its normal position. Under either of these conditions, the shoulder 127 of the dog 124 has left the tripping shaft 141, and hence the lower nose 126 of said dog has swung laterally to the left into latching position. In this position, the lower shoulder 108 on the latch 107 comes up and strikes the nose 126, thereby transmitting power impetus from the power actuator 115 through the brake operator 98 to the manual actuator 114. Hence, the manual actuator is quickly driven up to its restored position, such quick upward movement lifting the treadle 135 and the attendant's foot, even though his foot may be exerting substantial downward pressure on the treadle. The matching surfaces of the power driven hook 157 and of the shoulder 109 are preferably inclined downwardly in such relation that when a power drive is being transmitted through these surfaces they will not be unhooked by the engagement of the lower shoulder 108 against the nose 126, but will remain in engagement for driving the manual actuator back up to its normal position. It will be seen from this that the power actuator 115 assumes dominant control in the event of interfering operation of the two actuators. The power driven upward movement of the brake operator 98 reengages the brake, thereby releasing the clutch through the brake drum 71 and applying braking force to the crank shaft through the brake drum 72, the parts thereupon coming to rest in their normal position, such completing one cycle or a single trip operation. In the operation of applying the brake, the springs 83 assist in completing the upward movement of the brake operator 98 after the toggle mechanism 94—96 has moved beyond the dead center position x—x (as also indicated by the dotted line position in Figure 11). By appropriate adjustment of the brake shoes, toggle mechanism and related parts, substantially the entire brake engaging force or pressure may be transmitted from the power actuator 115, or from the springs 83, or from a combination of both.

Figures 13 and 14 illustrate the cyclical steps which occur when the control mechanism is set for repeating operation. This setting is obtained by swinging the handle 145 downwardly to its lower position, thereby disposing the kerf 141' of the tripping shaft 141 in vertical position, so that the shaft does not exert any tripping action on the hook 127 of the dog 124. Figure 13 shows the manual actuator 114 as having been depressed for starting the continuous running or repeating operation of the press. Because of the fact that the tripping shaft 141 is now in its non-tripping position, the nose 126 is not released from the shoulder 108 when the manual actuator reaches the lower limit of its motion; to the contrary, this nose remains in engagement with the hook 108, and hence holds the upper hook 109 of the latch 107 in its disengaged position where it cannot be hooked by the power driven hook 157. Hence, the power actuator 115 can continue to reciprocate indefinitely during the repeating operation of the press without reapplying the brake—so long as the manual actuator 114 is held depressed. However, as soon as the attendant allows the treadle 135 to swing upwardly, the upward restoring motion of the manual actuator 114 permits the latch 107 to swing to the left for placing the upper hook 109 in the path of the power driven hook 157. Accordingly, the upward reciprocation of the power actuator 115 immediately imparts power driven movement to the brake operator 98 for immediately reengaging the brake. This releases the clutch and applies braking force to the crank shaft, thereby quickly bringing the parts to rest at the completion of this continuous or repeating operation.

Figures 15, 16:
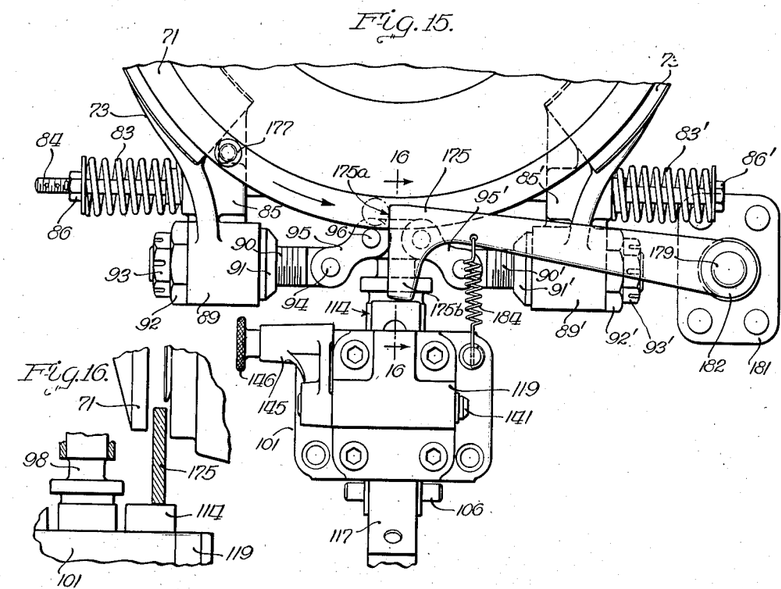
Figure 15 is a fragmentary transverse sectional view, similar to Figure 3, illustrating a modified construction.
Figure 16 is a detail sectional view taken on the plane of the line 16—16 of Figure 15.

Referring to the modified construction shown in Figures 15 and 16, this embodiment employs positive blocking means which will be effective to positively interrupt rotation of the clutch controlling brake drum 71 if there should be any tendency of this brake drum to continue rotation a substantial distance after the brake has been applied. This blocking means comprises a blocking arm 175 adapted to be swung into and out of the path of movement of a pin, stud, roller or other stop 177 projecting laterally from the outer portion of the brake drum 71. The arm 175 comprises a right angle blocking shoulder 175a which is adapted to be struck by the stop roller 177, and said arm also comprises a downwardly extending finger portion 175b which rides constantly on the upper end of the manual actuator 114. The other end of the blocking arm is pivotally mounted on a stud 179 carried by a bracket 181 secured to the press frame 24. A rubber bushing 182 may be interposed between the hub of the arm 175 and the stud 179 (or between the stud 179 and the bracket 181) for cushioning the shock occurring when the stop roller 177 strikes the blocking arm 175. A tension spring 184 extended between the blocking arm and a lower point of attachment serves to hold the lower finger portion 175b pressed against the upper end of the manual actuator 114, so that the blocking arm moves up and down directly with the manual actuator (Figure 16). In the operation of this embodiment, it will be seen that when the manual actuator 114 is moved downwardly to engage the clutch the blocking arm 175 is correspondingly moved downward to clear the stop roller 177. As soon as the manual actuator 114 is permitted to move upwardly for engaging the brake and releasing the clutch, the blocking arm 175 is correspondingly moved upwardly to interpose the blocking surface 175a in the path of the stop roller 177, for blocking continued rotation of the brake drum 71 if there should be any tendency of this drum to continue rotation beyond the desired stopping point.

Figures 17, 18:
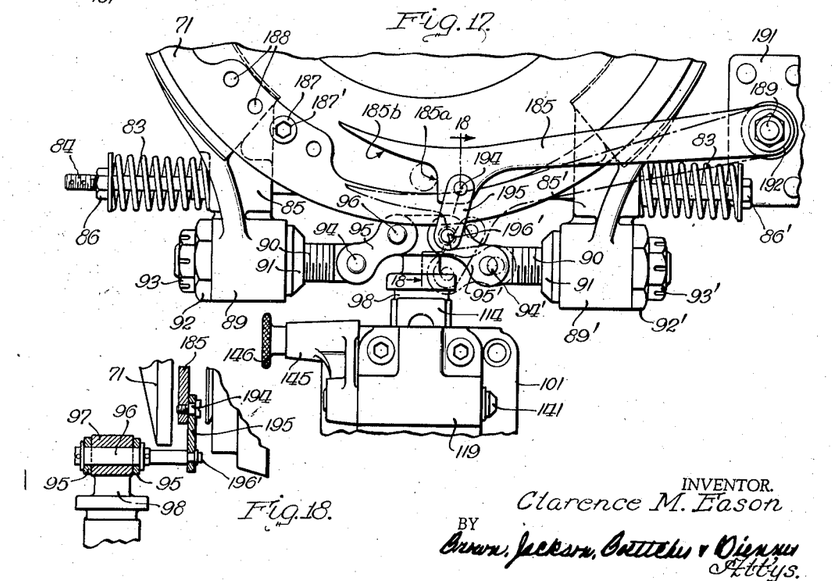
Figure 17 is a view similar to Figure 15, illustrating another modified construction.
Figure 18 is a detail sectional view taken on the plane of the line 18—18 of Figure 17.

Referring now to the modified construction shown in Figures 17 and 18, this embodiment also comprises a blocking arm 185 adapted to be swung into and out of the path of a stop roller 187 projecting laterally from the outer portion of the clutch controlling brake drum 71. The timed location of the stop roller can be adjusted relatively to the brake drum, by screwing the supporting stud 187' into any one of a series of tapped holes 188 provided in the brake drum 71. A similar timed adjustment may also be arranged for the stop roller 177 of Figure 15. The hub of the blocking arm is pivotally supported on a mounting pin 189 projecting from a mounting bracket 191 secured to the press frame. A rubber bushing 192 may be interposed between the hub and the pin, or between the pin and the bracket, to help cushion the blocking shock. In this embodiment, before the stop roller 187 comes into positive blocking engagement with the stop shoulder 185a on said lever, it first comes into engagement with a long cam surface 185b formed on the under side of the lever, for forcing the lever upwardly around the pivot 189. Pivoted to the lever on the pin 194 is a link 195 which has its lower end pivoted on a pin 196' carried by the brake operator 98. The pin 196' may project from the center of the crosshead 97 or any other portion of the brake operator, although in the simplified construction illustrated in Figure 18, this pin is shown as being an integral extension of the adjacent knuckle pivot 96'. Thus, the lever 185 responds directly to the motion of the brake operator 98, and, under certain safety conditions, the brake operator 98 responds directly to the motion of the lever. In the operation of this embodiment, the downward movement of the brake operator 98 in the operation of releasing the brake to engage the clutch, causes the lever 185 to be swung down to the dotted line position, to permit the stop roller 187 to pass freely above the lever. When the operator 98 moves upwardly in the operation of engaging the brake, the lever 185 is swung upwardly into the path of the stop roller 187, as shown in full lines. If the stop roller 187 does not come to rest in its normal position but moves into engagement with the cam surface 185b, then the lever 185 exerts increased braking pressure on the brake drum 71 through the operator 98. If this increased braking pressure still does not bring the brake drum 71 to a stop, then the stop roller 187 finally comes up against the positive blocking shoulder 185a, and positively stops the brake drum, in the same manner described above of the preceding embodiment.

Figure 19:
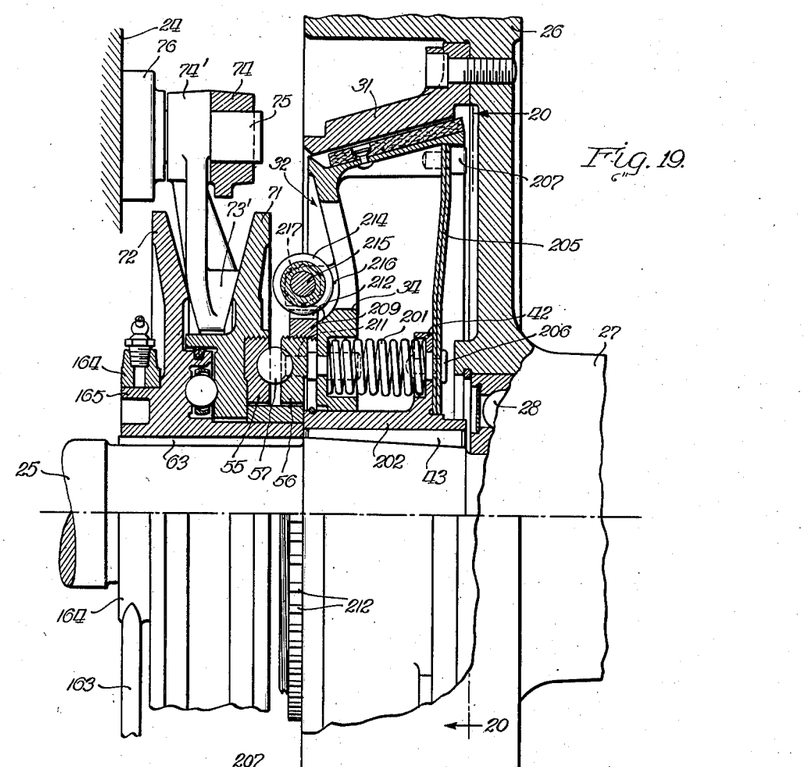
Figure 19 is a fragmentary sectional view of still another modified construction.
Figure 20:
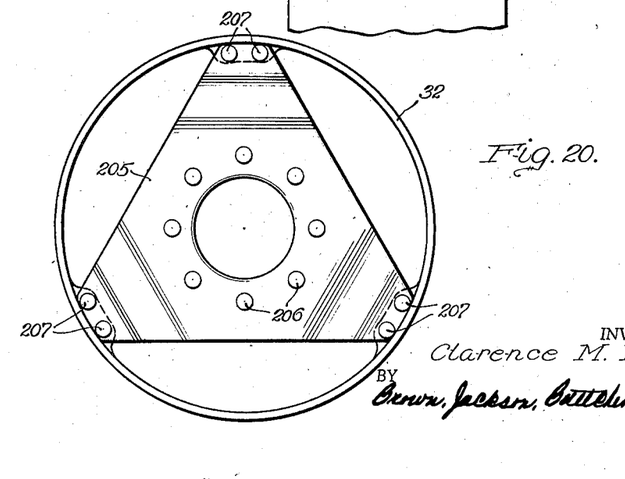
Figure 20 is a detail sectional view taken on the plane of the line 20—20 of Figure 19.

Referring now to the modified construction illustrated in Figures 19 and 20, in this embodiment the clutch is a straight spring-loaded clutch wherein the entire engaging pressure is derived solely from the compression springs 201 without utilizing servo mechanism. There is a circular series of these compression springs arranged in equally spaced angular relation around the hub 202 of the thrust reaction member 42. The front ends of the springs seat in pockets in the hub structure 34 of the shiftable clutch element 32, and the rear ends of the springs seat in pockets in the thrust reaction member. These springs tend constantly to force the shiftable clutch element 32 into engagement with the driving clutch element 31. The torque load of the clutch is transmitted from the shiftable clutch element 32 to the thrust reaction member 42 by a three-armed spring spider 205 which is shown in end elevation in Figure 20. The central portion of the spider is secured by rivets or screws 206 to the thrust reaction member 42, and the outer ends of the spider arms are secured by rivets or screws 207 to the shiftable clutch element 32. The spider is preferably composed of two or more laminations of spring steel of sufficient flexibility to accommodate the shifting movement of the clutch element 32, while still having enough strength in torsion to transmit the entire torque load from the member 32 to the member 42. This embodiment employs substantially the same arrangement of ball-cam servo releasing mechanism 55, 56, 57 responsive to the same brake mechanism 71, 72, 73, 73' as previously described. As optional features, the cam plate 55 is constructed as a separate ring having screw-threaded connection with the brake drum 71, and the other cam plate 56 is made axially adjustable relatively to the shiftable clutch element 32 through the medium of an adjusting ring 209, both of which optional features may be embodied in the first described construction if desired. The adjusting ring 209 is internally threaded to screw over an external thread on the cam ring 56, and the latter is held against rotation with the adjusting rotation of the ring 209 by pins 211 which permit relative axial movement between the cam ring 56 and the hub 34 of the shiftable clutch element. The side of the adjusting ring abuts against the hub 34, and its outer periphery is formed with worm wheel teeth 212 which mesh with a worm 214 mounted on a shaft 215 journaled in spaced bearing lugs 216 projecting from the web of the shiftable clutch element 32. A polygonal head 217 on the end of the shaft 215 is adapted to receive a wrench for rotating the worm to adjust the axial spacing between the cam ring 56 and the shiftable clutch element 32. The construction and operation of this worm wheel adjustment is disclosed in greater detail in my copending application Serial No. 405,745, filed August 7, 1941. The operation of this spring load clutch is substantially identical with that of the first described embodiment. This spring loaded construction may also embody the additional features of Figures 15, 16, 17, and 18 if desired.

While I have illustrated and described what I regard to be the preferred embodiments of my invention, nevertheless it will be understood that such are merely exemplary, and that numerous modifications and rearrangements may be made therein without departing from the essence of the invention.

I claim:

1. In combination, a driven member, a clutch for driving said driven member, servo releasing mechanism for releasing said clutch, brake mechanism operative to govern said servo releasing mechanism and also operative to apply braking force to said driven member, a first actuating means for actuting said brake mechanism to permit engagement of said clutch, and a second actuating means for actuating said brake mechanism to automatically release said clutch independently of said first actuating means.

2. In combination, a driven member, a clutch for driving said driven member, servo releasing mechanism for releasing said clutch, brake mechanism operative to govern said servo releasing mechanism and also effective to apply braking force to said driven member, a first actuating means for actuating said brake mechanism to permit engagement of said clutch, and a second actuating means for actuating said brake mechanism to automatically release said clutch in timed relation to the motion of said driven member and independently of said first actuating means.

3. In combination, a driven member, a clutch for driving said driven member, servo releasing mechanism for releasing said clutch, brake mechanism operative to govern said servo releasing mechanism and also operative to apply braking force to said driven member, manual actuating means for actuating said brake mechanism to permit engagement of said clutch, and automatic power driven actuating means for actuating said brake mechanism to automatically release said clutch in timed relation to the motion of said driven member and independently of attempted interfering operation by said manual actuating means.

4. In combination, a driven member, a clutch for driving said driven member, ball-cam servo releasing mechanism for releasing said clutch, brake mechanism operative to govern said servo releasing mechanism and also operative to apply braking force to said driven member, a manual actuator for actuating said brake mechanism to permit engagement of said clutch, a power actuator for actuating said brake mechanism to release said clutch independently of said manual actuator, and means for driving said power actuator from said driven member whereby to time the release of the clutch relatively to the motion of said driven member, and whereby to overcome interfering operation accidentally attempted by said manual actuator.

5. In combination, a driven member, a friction clutch for driving said driven member, servo engaging mechanism responsive to the torque transmitted to said driven member for creating a high engaging pressure in said clutch, servo releasing mechanism for releasing said clutch, brake mechanism operative to govern said servo releasing mechanism and also operative to apply braking force to said driven member, a first actuating means for actuating said braking mechanism to permit engagement of said clutch and a second actuating means for actuating said brake mechanism to automatically release said clutch in timed relation to the motion of said driven member and independently of said first actuating means.

6. In clutch mechanism for punch presses and the like, the combination of a clutch for controlling the transmission of power to the crank shaft of the press, a treadle for starting the press, and control mechanism for said clutch responsive to said treadle and selectively settable to effect single-trip operation each time said treadle is depressed or to maintain continuous repeated operation of the press so long as the treadle is held depressed, said control mechanism comprising a manual actuator for permitting engagement of said clutch, a power actuator for releasing said clutch, means for driving said power actuator concurrently with said crank shaft to time the release of said clutch relatively to the motion of said crank shaft, and means operative when said control mechanism is set to effect single-trip operation for causing said power actuator to assume dominant control over said clutch in the event that said manual actuator accidentally attempts to interfere with the operation of said power actuator.

7. In clutch mechanism of the class described, the combination of a driven member, a clutch for driving said driven member comprising driving and driven clutch elements, brake mechanism for controlling the engagement of said clutch comprising a brake operating member, a manual actuator for actuating said brake operating member in one direction, an automatic actuator for actuating said brake operating member in the other direction, means responsive to the motion of said driven member for driving said automatic actuator, and means for causing said automatic actuator to actuate said brake operating member independently of accidental conflicting operation by said manual actuator.

8. In clutch mechanism for driving the crank shaft of a punch press or the like, the combination of a clutch, control mechanism for said clutch comprising a brake adapted to be engaged to control the release of said clutch and to be released to control the engagement of said clutch, a brake operator, a manual actuator for actuating said brake operator in one direction, an automatic actuator power driven from said crank shaft for actuating said brake operator in the other direction, means for adjusting the timing of said automatic actuator relatively to said crank shaft, and connector means for establishing operative connection selectively between either of said actuators and said brake operator, and preventing the other of said actuators having such operative connection when the first of said actuators has said operative connection.

9. In clutch mechanism, the combination of a driven member, a clutch for driving said member comprising a clutch element shiftable into and out of clutching engagement, a brake, means responsive to said brake for shifting said clutch element, spring toggle mechanism adapted to be biased to each side of a dead center position for operating said brake, said toggle mechanism applying said brake when biased to one side of said dead center position, and releasing said brake when biased to the other side of said dead center position, manually actuated means for moving said toggle mechanism to brake-off position, power driven means responsive to said driven member for moving said toggle mechanism to brake-on position, and means for adjusting the timing of said power driven means relatively to said driven member.

10. In a punch press having a crank shaft, the combination of a clutch for governing the drive to said crank shaft, control mechanism for said clutch comprising a brake, means for releasing said clutch when said brake is engaged and for engaging said clutch when said brake is released, an operator for said brake, spring toggle mechanism acting on said brake operator, a treadle responsive actuator, a power responsive actuator, a latch connected with said brake operator, means moving with said treadle responsive actuator for engaging said latch to move said brake operator in one direction, means moving with said power responsive actuator for engaging said latch to move the brake operator in the other direction, driving means for transmitting a drive from said crank shaft to said power responsive actuator, and means for adjusting the timed relation between said crank shaft and said power responsive actuator.

11. In a punch press having a crank shaft, the combination of a clutch for governing the drive to said crank shaft, control mechanism for said clutch comprising a brake, means for releasing said clutch when said brake is engaged and for engaging said clutch when said brake is released, an operator for said brake, spring toggle mechanism acting on said brake operator, a treadle responsive actuator, a power responsive actuator, a latch connected with said brake operator, dog means moving with said treadle responsive actuator for engaging said latch to move said brake operator in one direction, hook means moving with said power responsive actuator for engaging said latch to move the brake operator in the other direction, driving means for transmitting a drive from said crank shaft to said power responsive actuator, means for adjusting the timed relation between said crank shaft and said power responsive actuator, and change-over means coacting with the dog means of said treadle responsive actuator for selectively converting said clutch control mechanism from single-trip operation to repeating operation and vice versa.

12. In a punch press having a crank shaft and crank, the combination of a friction clutch for driving said crank shaft, a first brake drum for controlling said clutch, a second brake drum for stopping said crank shaft, brake means acting substantially simultaneously on both brake drums, ball-cam means for releasing said clutch when said first brake drum is engaged, means for engaging said clutch when said first brake drum is released, a brake operator for actuating said brake means, spring biased toggle mechanism acting on said brake operator, a manual actuator, a power actuator, a latch pivotally mounted on said brake operator, a dog pivotally mounted on said manual actuator and adapted to engage said latch, a hook on said power actuator adapted to engage said latch, means for driving said power actuator from said crank shaft, an interrupter shoulder on said dog, and an interrupter device movable into and out of the path of said interrupter shoulder to convert the mechanism from single-trip operation to repeating operation and vice versa.

13. In combination, a clutch for transmitting torque to a driven member, torque responsive servo mechanism operative to transmit engaging pressure to said clutch, and tending to rotate said driven member when said clutch is disengaged, brake responsive control mechanism operative to transmit releasing pressure to said clutch and tending to hold said driven member against such rotation when said clutch is disengaged, a manual actuator operative to control the engagement of said clutch through said control mechanism, and a power actuator operative to release said clutch through said control mechanism in timed relation to the motion of said driven member and independently of accidental interfering operation by said manual actuator.

14. In combination, a clutch for controlling the drive to a driven member, clutch control mechanism comprising brake apparatus for controlling the engaging and releasing of the clutch, a manual actuator for actuating said brake apparatus to permit said clutch to engage, an automatic actuator responsive to said driven member for actuating said brake apparatus to release said clutch, and blocking means responsive to overtravel of said driven member for acting on said brake apparatus to release said clutch.

15. In combination, a clutch for controlling the drive to a driven member, a brake drum operatively connected to control said clutch, brake means adapted to engage said brake drum, a manual actuator for actuating said brake means to engage said clutch, a power actuator for actuating said brake means to release said clutch, means for driving said power actuator from said driven member, a stop projection rotating with said brake drum, a blocking member movable into and out of the path of said stop projection, and means for automatically moving said blocking member into and out of such path at different times in the operating cycle of the clutch.

16. In combination, a clutch for controlling the drive to a driven member, clutch control mechanism comprising brake apparatus for controlling the engaging and releasing of the clutch, a manual actuator for actuating said brake apparatus to permit engagement of said clutch, an automatic actuator responsive to said driven member for actuating said brake apparatus to release said clutch, and blocking means responsive to overtravel of said driven member for acting on said brake apparatus to release said clutch.

17. In combination, a clutch for controlling the drive to a driven member, clutch control mechanism comprising brake apparatus for controlling the engaging and releasing of the clutch, a manual actuator for actuating said brake apparatus to permit engagement of said clutch, an automatic actuator responsive to said driven member for actuating said brake apparatus to release said clutch, and safety mechanism operative upon predetermined overtravel of said driven member for increasing the braking energy exerted on said brake apparatus and thereafter positively blocking said brake apparatus.

18. In clutch mechanism, the combination of a driven member, a clutch for driving said member comprising a clutch element shiftable into and out of clutching engagement, a brake operative to govern said clutch and also operative to apply braking force to said driven member, means responsive to said brake for shifting said clutch element, spring toggle mechanism adapted to be biased to each side of a dead center position for operating said brake, said toggle mechanism applying said brake when biased to one side of said dead center position, and releasing said brake when biased to the other side of said dead center position, manually actuated means for moving said toggle mechanism to brake-off position, and power driven means responsive to said driven member for moving said toggle mechanism to brake-on position.

19. In a punch press having a crank shaft, the combination of a clutch for governing the drive to said crank shaft, a brake operative to control said clutch and also operative to apply braking force to said crank shaft, means for releasing said clutch when said brake is engaged and for engaging said clutch when said brake is released, an operator for said brake, spring toggle mechanism acting on said brake operator, a treadle responsive actuator, a power responsive actuator, a latch connected with said brake operator, means moving with said treadle responsive actuator for engaging said latch to move said brake operator in one direction, means moving with said power responsive actuator for engaging said latch to move the brake operator in the other direction, and driving means for transmitting a drive from said crank shaft to said power responsive actuator.

CLARENCE M. EASON.